Aug. 30, 1960 F. R. TANCO ET AL 2,951,233

INFORMATION STORAGE SYSTEM

Filed Oct. 17, 1956 3 Sheets-Sheet 1

INVENTORS.
Felipe R. Tanco &
Luis A. Fernandez Rivas
BY
Morris Kahn[?]
ATTORNEY.

Aug. 30, 1960 F. R. TANCO ET AL 2,951,233

INFORMATION STORAGE SYSTEM

Filed Oct. 17, 1956 3 Sheets-Sheet 2

INVENTORS.
Felipe R. Tanco &
Luis A. Fernandez Rivas
BY
Morris Kahn
ATTORNEY.

INVENTORS.
Felipe R. Tanco &
Luis A. Fernandez Rivas
BY Morris Robbin
ATTORNEY 2,951,233
Patented Aug. 30, 1960

2,951,233

INFORMATION STORAGE SYSTEM

Felipe R. Tanco, Collingswood, N.J., and Luis A. Fernandez Rivas, Levittown, N.J., assignors to Radio Corporation of America, a corporation of Delaware Filed Oct. 17, 1956, Ser. No. 616,465

16 Claims. (Cl. 340—172.5)

Figure 1:
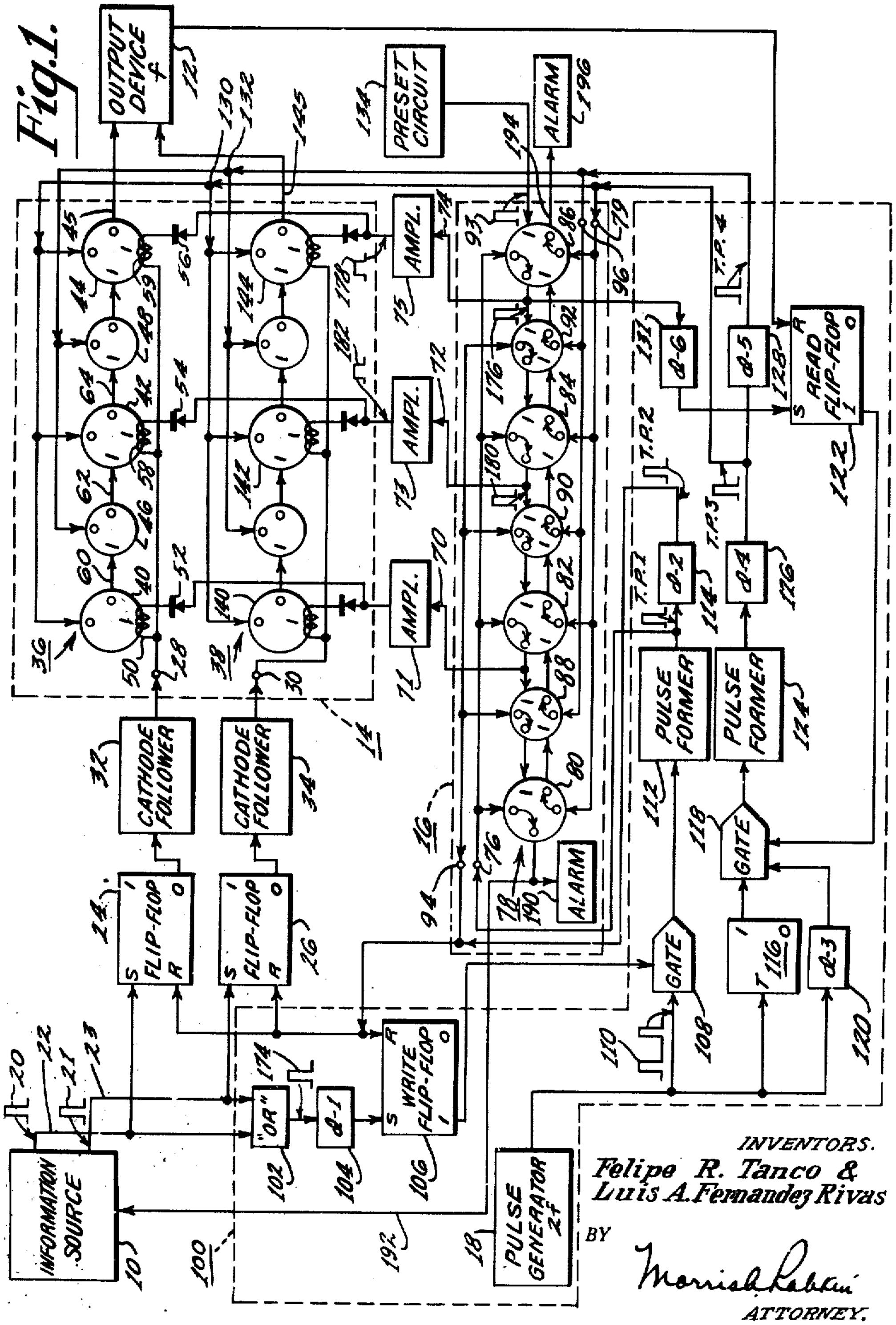

This invention relates to digital information handling systems and particularly to an information storage system that may be used as a buffer storage between information handling devices that operate at different rates.

Difficulties arise in transferring information from one information handling device to another, say from an input device to an output device, because the rates at which these devices can handle information may be different. Furthermore, the information rate of each of these devices may not be uniform, so that these devices cannot be synchronized to a common timing reference. In order to transfer information from the input device to the output device, a time transfer system or information storage, sometimes called a buffer storage, is required which can operate at information rates consistent with both devices.

Accordingly, it is among the objects of this invention to provide:

A new and improved information storage system;

A new and improved system for transferring information between information handling devices that operate at different rates;

A new and improved information storage system for controlling the information transfer in the proper sequence;

A novel buffer storage system better than prior buffer storage systems.

In accordance with this invention, an information storage system includes a memory having a plurality of signal storing stages. Signals are shifted from stage to stage of the memory in a certain order. The processing operations of either write-in or read-out of successive information units may be on a fixed-address basis; and the other of these processing operations is on a shifting-address basis corresponding to the shifting order. The fixed-address processing operation is repetitive at the fixed-address. A reversible distributor provides signals for controlling the shifting-address processing operation. This distributor follows the processing operations and the shifting of the address in the memory with these operations, and directs the shifting-address processing operation to the proper address.

Figure 2:
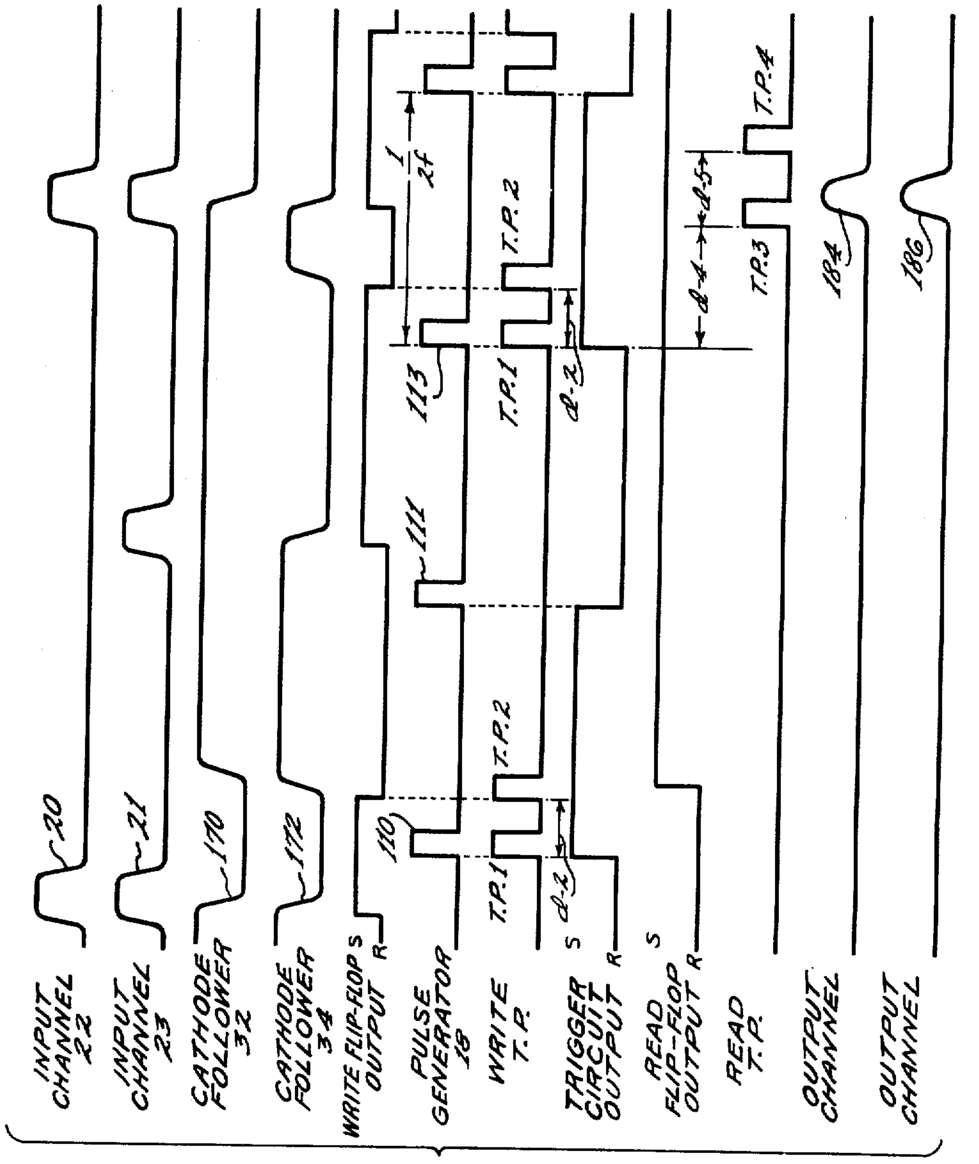
Figure 3:
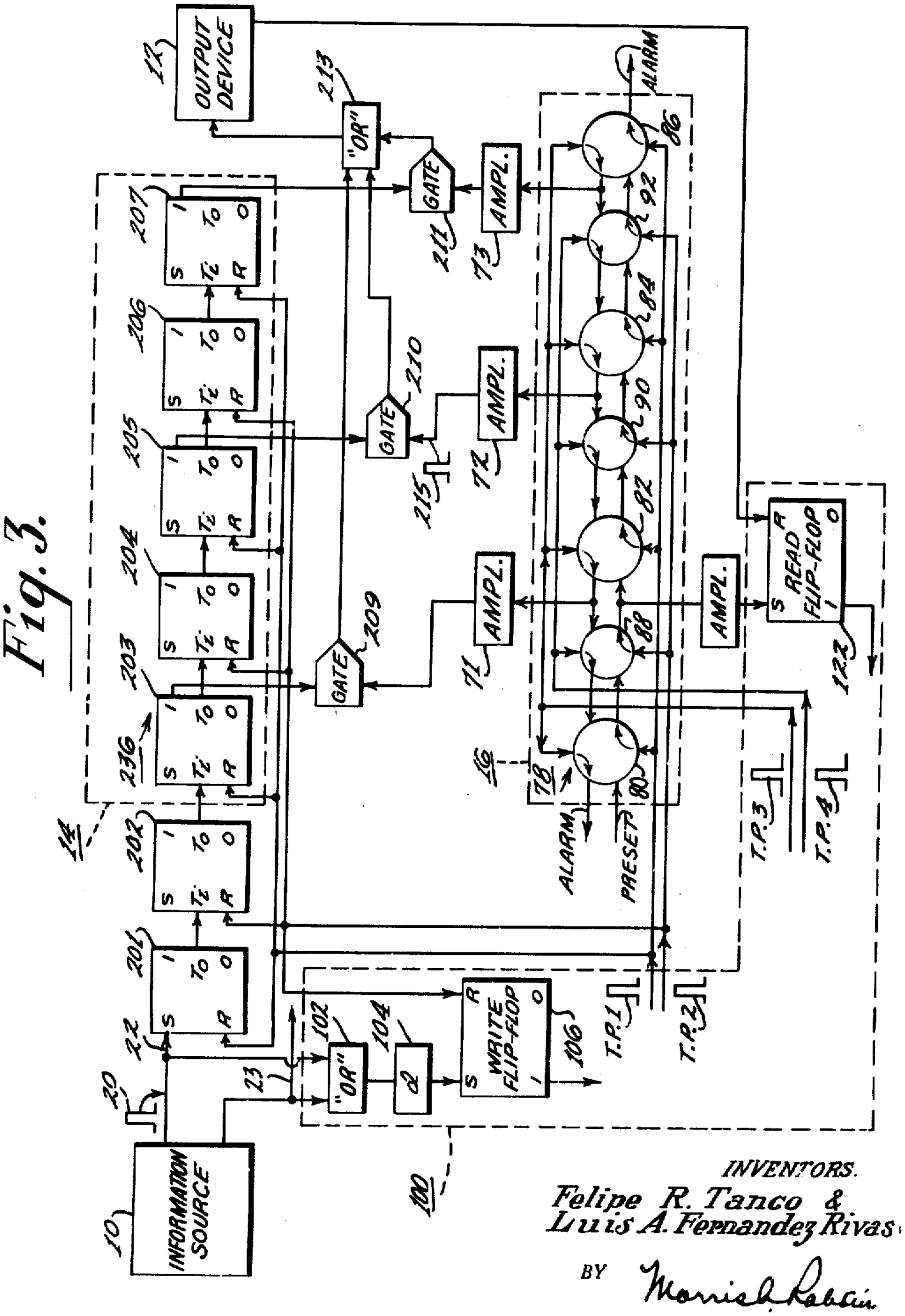

The foregoing and other objects, the advantages and novel features of this invention, as well as the invention itself both as to its organization and mode of operation may best be understood from the following description when read in connection with the accompanying drawing, in which like reference numerals refer to like parts, and in which:

Figure 1 is a schematic block diagram of a serial information storage system embodying this invention, Figure 2 is an idealized timing graph of the relationship of waveforms occurring at various portions of the system of Figure 1, and Figure 3 is a schematic block diagram of another embodiment of this invention.

In Figure 1, an information source 10 is shown on the left, which source 10 may be, for example, operating at an asynchronous information rate. For example, this source 10 may be a magnetic-recording tape-reading station. At the right of Figure 1 is an output device 12 which may be, for example, operating synchronously at a frequency *f*; this device 12 may be a magnetic tape recording station. A serial memory 14 and a control system 16 therefor are used for transferring information from the source 10 to the output device 12 at information rates that are compatible to both the source and the output device. A pulse generator 18, shown in the lower left of Figure 1, may be part of the output device 12 or otherwise associated with this device 12 to operate it synchronously at the frequency *f*.

The signals from the source 10 (which may take the form of binary signals such as a pulse 20, 21 and the absence of a pulse) are produced at parallel input channels 22, 23. Combinations of signals occurring at the same time at the parallel channels 22, 23 form a code group that is treated as an information unit and hereinafter called an information character. Only two information channels 22, 23 are shown in the system of Figure 1 by way of illustration; however, as many information channels as desired may be employed. Two known information systems employ five and seven channels respectively; in such systems, five and seven channels 22, 23, respectively, would be employed.

Each channel 22, 23 from the source 10 is connected to one input, the S-input, of a different flip-flop 24, 26. These flip-flops 24, 26, and others shown in Figure 1, each may be a bistable trigger circuit having two input terminals designated S (set) and R (reset) and two output terminals designated "1" and "0." The application of a pulse to the S-input sets the flip-flop circuit with its 1-output established at a relatively high voltage level and its 0-output established at a low output level. Application of a pulse to the R-input resets the trigger circuit at the reverse condition. One output of each flip-flop 24, 26 is connected to a different input 28, 30 of the serial memory 14. Buffer circuits such as the cathode followers 32, 34 shown in Figure 1 may be inserted between the flip-flop outputs and the memory inputs 28, 30 where appropriate for the particular types of circuit embodiments.

The serial memory 14 includes a plurality of shift registers 36, 38, each associated with a different one of the information channels 22, 23. This invention is not restricted to the use of any particular type of shift-register; for example, well-known shift registers based on the use of electron tubes, transistors, or various solid state devices may be used. The shift registers 36, 38 shown in Figure 1 are shown by way of illustration and are of the type described in an article entitled "Magnetic Core Circuits for Digital Data-Processing Systems," by Loev, et al., in the Proceedings of the I.R.E., February 1956, pages 154, 158.

Three information storage stages are shown in the registers 36, 38 by way of a simple illustration; as many stages as desired and as are appropriate for the relative information rates of the source 10 and device 12 may be employed. The information storage stages 40, 42, 44 of the register 36 each includes a magnetic core made of a material having a rectangular hysteresis characteristic. Such cores may store binary information in the form of two opposite remanence states of substantial saturation; these two states represent the binary digits "0" and "1," respectively. Signals are transferred from the first core 40 to the second core 42 by way of a transfer or temporary storage core 46. Likewise, signals are transferred from the second core 42 to the last core 44 by way of another transfer core 48. These transfer cores 46 and 48 are generally of the same type as the storage cores 40, 42, 44.

Information is written in the first core 40 by means of a winding 50 linked to that core 40. Current flow in the forward direction of a diode 52, connected to one terminal of the winding 50, energizes that winding 50 to drive the core 40 to the state representing the digit "1," as indicated by the numeral adjacent that winding 50 in the drawing. In a similar manner, currents in the forward direction through the associated diodes 54, 56, respectively, likewise energize the windings 58, 59 and drive the cores 42, 44 to the "1" state.

A second input in the form of a shift pulse (shown as TP3) in a winding (not shown) linked to the core 40 tends to drive the core 40 to the "0" state (as indicated by the numeral adjacent the other input of the core 40). When the core 40 is so driven to the 0-state from the 1-state, an output pulse is generated at the 0-output of the core 40 transferred by way of the connection 60 to the 1-input of the core 46. This pulse on the connection 60 drives the core 46 to the 1-state. A shift pulse (shown as TP4) applied to the 0-input of the core 46 drives that core 46 from the 1-state to the 0-state to induce a pulse that is transferred by way of the connection 62 to another 1-input of the core 42. This transferred pulse drives the core 42 to the 1-state. In a similar manner, when the core 42 is driven from the 1-state of the 0-state by means of a shift pulse (TP3) applied to the 0-input, a pulse is transferred by way of the connection 64 to drive the core 48 to the 1-state, and so on. A shift pulse (TP3) applied to the last core 44 induces an output pulse on the read-out channel 45 that is applied to the output device 12. The 0-inputs of the cores 40, 42, and 44 receive the pulse TP3 simultaneously, and the 0-inputs of the cores 46 and 48 receive the pulse TP4 simultaneously. If any of the magnetic cores of the registers 36 are in the 0-state when a pulse is applied to the 0-input, the core remains substantially unchanged in its 0-state and no output pulse is induced or transferred to the next succeeding core.

The construction and operation of the register 38 is similar to that of the register 36. Additional details of construction and operation of these shift registers 36 and 38 are provided in the aforementioned article in the Proceedings of the I.R.E.

The control device 16 is a reversible distributor having three output positions 70, 72, and 74 respectively. This distributor 16 produces a control or switching signal at one of the positions 70, 72, and 74, whichever one is in an "active" state, for each pulse (shown as TP1) applied to the input terminal 76. This distributor 16 operates somewhat as a stepping switch to step the "active" state from position to position to the left successively as the input 76 is pulsed. When the input 79 is pulsed (by the pulse shown as TP3), the position of "active" state is stepped one step in the other direction to the right. Each of the distributor output positions 70, 72, 74 is connected to the input of a different pulse amplifier or driver 71, 73, 75. The outputs of the amplifier 71, 73, 75 are connected to the anodes of the diodes 52, 54, 56, the cathodes of which are connected to terminals of the input windings 50, 58, 59, respectively. The other terminals of these windings are connected to the input 28. The amplifier 71, 73, 75 are also connected in a similar manner to diodes and input windings of the register 38, and therethrough to the register input 30.

For this embodiment of the invention, a reversible shift register 78 is used for the reversible distributor of the control system 16 shown in Figure 1. By way of illustration, the reversible register 78 that is shown is the type described in the aforementioned article in the Proceedings of the I.R.E., at page 159. This shift register 78 has three signal storing stages shown as the magnetic cores 82, 84, and 86, which correspond respectively to the stages 40, 42, 44 of the shift register 36. In addition, the shift register 78 has a fourth storage position 80 for a purpose to be described hereinafter. A transfer core 88, 90, 92 is connected between each two adjacent storage cores. The cores of the shifter register 78 are generally similar to the storage cores of the shift register 36, except that the cores in the shift register 78 generally have two 0-inputs and two 0-outputs. Each of the 0-outputs is associated with but one of the 0-inputs on the same core. This association between a 0-output and a 0-input is shown by a connecting line therebetween on each core. A pulse is induced at a 0-output only when the associated 0-input is pulsed to drive its core from the 1-state to the 0-state.

Ordinarily, only one of the cores in the shift register 78 is in the 1-state; this may be done by driving all the cores to the 0-state (by appropriate windings, not shown) and by applying a pulse 93 to the "preset" 1-input of the core 86. A pulse (TP1) applied to the input 76 of the register 78 transfers the 1-state from the core 86 to the core 92. A pulse (TP2) applied to the input 94 transfers the 1-state from the core 92 to the core 84. This transfer of the 1-state to the left in the shift register 78 may be continued by alternate pulses applied to the inputs 76 and 94. If the core 84 is in the 1-state and a pulse (TP3) is applied to the input 79, the 1-state is transferred from the core 84 to the core 92. A pulse (TP4) applied to the input 96 transfers the 1-state from the core 92 to the core 86. Thus, alternate pulses applied to the terminals 79 and 96 produce a stepping or shifting operation in the shift register 78 in the direction to the right.

The 0-outputs of the cores 82, 84, 86 on transfer to the left are also connected to the distributor output positions 70, 72, 74, respectively, and to the amplifiers 71, 73, 75. The 0-outputs of the core 80 on transfer to the left and of the core 86 on transfer to the right may be connected to alarm circuits (not shown).

The write-in and read-out operations performed with the memory 14 and the control system 16 are coordinated and synchronized by means of the timing and logic circuitry 100. This timing circuitry 100 includes an "or" circuit that receives the input pulses 20 and 21 from the channels 22, 23. This "or" circuit 102 produces a pulse at its output if it receives a pulse at any of its inputs. The "or" circuit output is connected through a delay circuit 104 to the S-input of a "write" flip-flop 106. The 1-output of this flip-flop 106 is connected to an input of a two-input "and" gate 108. The other input of this gate 108 receives pulses 110 from the pulse generator 18. The output of this gate 108 is applied to a pulse former 112, which generates a timing pulse TP1 in response to a pulse from the gate 108. This pulse TP1 is delayed by a delay circuit 114 to produce another timing pulse TP2. The pulses TP1 and TP2 are respectively applied to the left-shift input terminals 76 and 94 of the reversible register 78.

The pulses 110 from the pulse generator 18 are also applied to the trigger input T of a trigger circuit 116. This trigger circuit 116 is a bistable flip-flop circuit similar to that described above, which assumes its two stable positions alternately with successive input pulses applied to its trigger input T. The 1-output of the trigger circuit 116 is applied to an input of a three-input "and" gate 118. The pulses 110 are applied through a delay line 120 to a second input of that gate 118. The third input of the gate 118 is connected to the 1-output of a "read" flip-flop 122. The output of the gate 118 is applied to a pulse former 124, which, in turn, applies its output to the delay lines 126 and 128 in series. The output of the delay line 126 is the timing pulse TP3; and the output of the delay line 128 is the timing pulse TP4. These timing pulses TP3 and TP4 are respectively applied to the shift-right inputs 79 and 96 of the reversible register 78. These timing pulses TP3 and TP4 are also applied to the shift-pulse input terminals 130 and 132, respectively, of the memory registers 36 and 38.

The output of the pulse amplifier 75 is also connected through the delay circuit 131 to the S-input of the "read" flip-flop 122. The output device 12 may have an output that is connected (as shown in Figure 1) to the R-input of the "read" flip-flop 122. The device 12 may supply, for example, a pulse on to this R-input when it receives the last character of a message. The timing pulse TP2 is also applied to the R-inputs of the flip-flops 24, 26, and 106.

The operation of the system of Figure 1 is described with reference to the graph of Figure 2; this graph illustrates in idealized form the time-relationships of waveforms occurring at various portions of this system.

The initial conditions for operation are with all of the flip-flops in the reset condition and all of the magnetic cores of the registers 36, 38, and 78 in the 0-state; such reset operations may be performed in any appropriate manner such as by means of reset windings (not shown). The core 86 of the reversible register 78 is preset to the 1-state by a pulse 93 applied to the "preset" 1-input of that core 86. This "preset" operation may be performed in any appropriate manner, for example, by means of a manually operated switch circuit 134. When the first character is supplied by the source 10, for example, in the form of pulses 20, 21 at the channels 22, 23, both associated flip-flops 24 and 26 are set. The 0-outputs of these flip-flops 24 and 26 are then at a low voltage level as are the outputs (waveforms 170 and 172 in Figure 2) of the associated cathode followers 32 and 34. The 0-outputs of these flip-flops 24 and 26 are used for the particular diode switching circuits provided by the diodes 52, 54, and 56.

The input pulses 20, 21 are also applied to the "or" circuit 102. An output pulse 174 from that circuit 102 is delayed by the delay circuit 104 a time, *d*—1, sufficient for the flip-flops 24 and 26 and cathode followers 32 and 34 to establish the voltage levels 170 and 172 in accordance with the input pulses 20. The delayed pulse through the delay line 104 sets the write flip-flop 106. The 1-output of this flip-flop 106 enables the gate 108 to pass the next pulse 110 from the pulse generator 18. The pulse passed by the gate 108 actuates the pulse former 112 to generate the spaced timing pulses TP1 and TP2.

The pulse TP1 is applied to the shift-left input 76 of the reversible register 78 and, thereby, to the shift-left 0-input of the core 86. The core 86 is driven to the 0-state, and induces an output pulse 176 at its shift-left 0-output. This induced pulse 176 drives the core 92 to the 1-state. The pulse 176 is also applied by way of the distributor position 74 to the pulse amplifier 75, which, in turn, generates a pulse 178. The voltage levels of this pulse 178 and of the cathode follower output applied to the input 28 are such as to produce a net voltage across the diode 56 (1) that causes this diode 56 to conduct in the forward direction if the voltage level at the input 28 is relatively low (corresponding to the flip-flop 24 being set), (2) and that biases this diode 56 in the backward direction when the input 28 is at a relatively high voltage level (corresponding to the flip-flop 24 being reset). Thus, with the input 28 at a low voltage, the pulse 178 generated by the amplifier 75 passes in the forward direction through the diode 56 energizing the winding 59 and driving the core 44 to the 1-state.

In a similar manner, the core 144 of the register 38 is also driven to the 1-state, so that both the cores 44 and 144 are in states corresponding to the 1-inputs 20, 21 that set the flip-flops 24 and 26. The cores 84 and 82 are not changed from their 0-states by this first timing pulse TP1, and, therefore, the amplifiers 71 and 73 are not actuated. Accordingly, the other cores of the registers 36 and 38 remain unchanged in the 0-states.

The timing pulse TP2 immediately following the previously described pulse TP1 is applied to the input terminal 94 of the register 78 after the core 92 has been driven to the 1-state. The delay period *d*—2 between the pulses TP1 and TP2 provided by the circuit 114 is sufficient to allow the cores of the register 78 to be turned over by the pulse TP1 and also for the pulse 178 to be generated and to turn over the cores of the registers 36 and 38. This timing pulse TP2 applied to the terminal 94 drives the core 92 to the 0-state, which results in a pulse being transferred to the left to the core 84 to drive that core to the 1-state. This same timing pulse TP2 also resets the write flip-flop and the input flip-flops 24 and 26.

At the end of the second timing pulse, TP2, the input character has been established in the last-stage cores 44 and 144 of the registers 36 and 38 and the 1-state has been shifted to the left in the reversible register 78 to the core 84. Thus, the 1-state residing in the core 84 is in that core of the register 78 which corresponds to the next-available empty cores 42 and 142 of the registers 36 and 38.

When the next input character is supplied by the source, the flip-flops 24, 26 establish voltage levels accordingly, and the timing pulses TP1 and TP2 are generated in a manner similar to that described above for the first input character by the pulse 113 (Figure 2) from the generator 18. The timing pulse TP1 drives the core 84 to the 0-state inducing a pulse 180 that is applied to the distributor output position 72 and that drives the core 90 to the 1-state. If the input character that is received includes, for example, a pulse 21 on the channel 23 and no pulse on the channel 22, then the pulse 182 generated by the amplifier 73 drives the core 142 to the 1-state and leaves the core 42 unchanged in the 0-state. The timing pulse TP2 is applied to the core 90 to transfer the 1-state to the core 82. This core 82 being in the 1-state marks the corresponding stage cores 40 and 140 of the registers 36 and 38 as the next available empty cores. This timing pulse TP2 also resets the flip-flops 24, 26, and 106.

The same pulse 110 (Figure 2) from the generator 18 that initiated the generation of the first set of timing pulses TP1, TP2, is also applied to the trigger circuit 116 and by way of the delay circuit 120 to the gate 118. When the trigger circuit 116 is triggered, its 1-output applies a high or enabling voltage level to the gate 118. However, the voltage level applied to the third input of that gate 118 from the "read" flip-flop 122, which is reset at this time, is a relatively low, inhibiting voltage level. Thus, the pulse through the delay circuit 120 (the delay time *d*—3 of which is just sufficient to permit the trigger circuit to be triggered and change its voltage level) is not passed by the gate 118. Accordingly, the timing pulses TP3 and TP4 are not generated at this time. The transfer pulse 176 from the core 86 is applied to the S-input of the "read" flip-flop 122 by way of the delay circuit 131. The delay, *d*—6, of the circuit 131 is just sufficient to delay setting of the flip-flop 122 until after termination of the pulse that is applied to the gate 118 via the delay circuit 120. The gate 118 receives enabling voltages from both the trigger circuit 116 and the "read" flip-flop 122 at this time.

The second generator pulse 111 (Figure 2) generally must occur before the second input character arrives. Consequently, the gate 108 is closed to this pulse 111, and a set of pulses TP1 and TP2 are not generated. However, this pulse 111 triggers the trigger circuit 116 back to the reset condition to place the gate 118 in an inhibited condition. Thus, again, the timing pulses TP3 and TP4 are not generated.

The third pulse 113 (Figure 2) from the generator 18 that initiated the generation of the second set of timing pulses TP1 and TP2 triggers the circuit 116 back to the set condition. The 1-output voltage of the circuit 116 and the 1-output voltage of flip-flop 122 are such as to enable the gate 118 to pass the delayed pulse from the circuit 120. Thus pulse from the gate 118 actuates the pulse former 124 to generate a pulse that is applied to the delay circuits 126 and 128. The delay time *d*—4

(Figure 2) of the delay circuit 126 considered from the start of the corresponding pulse TP1 is sufficient for the reversible-register transfer cores 88, 90, and 92 to be turned over by the pulse TP2 and for the pulse transfer to the succeeding cores 82, 84, and 86 to be completed.

The delayed pulse TP3 from the delay circuit 126 is applied to the shift terminal 130 of the memory 14, and tends to drive all of the storage cores of the registers 36 and 38 to the 0-state. Thus, the pulse TP3 actuates a shift operation to the right from the storage cores to the succeeding transfer cores. This shift operation effects a read-out of the character in the last stage cores 44 and 144 to the read-out channels 45, 145 as these cores are driven to the 0-state. These output pulses 184, 186 (Figure 2) correspond to the first character written in the memory 14 and are applied to the output device 12.

The delay time $d-5$ of the circuit 128 provides an additional delay sufficient for the transfer cores to turn over and complete the first part of the shift operation. The resulting delayed pulse is the pulse TP4 which is applied to the terminal 132 of the memory 14. This pulse TP4 completes the transfer operation to the right in the registers 36 and 38. Thus, this set of pulses TP3 and TP4 actuate a read out of the character stored at the last stage cores 44 and 144 and also shift the remaining stored character one stage to the right from the cores 42, 142 to the cores 44, 144. Thus, at the end of this pulse TP4, the cores 42 and 142 are empty and are the next available empty ones.

This same pulse TP3 that actuated the first read-out from the memory 14 is applied to the shift-right terminal 79 of the reversible register 78, and, thereby, to the core 82, which is in the 1-state at that time. This pulse TP3 drives the core 82 to the 0-state, inducing a pulse at the shift-right 0-output, which pulse transfers the 1-state to the core 90. The pulse TP4 of this same set of pulses is also applied to the shift-right terminal 96 to complete the shift-right operation of the 1-state from the core 90 to the core 84. Thus, at the end of this read-out operation, as determined by the pulse TP4, the 1-state in the reversible register 78 is in the second stage core 84 corresponding to the next available empty stage cores 42 and 142 in the memory 14. Thus, again, the position of the 1-state in the reversible register marks the location of the next available empty memory stage for the succeeding write-in operation.

The trigger circuit 116 places the gate 118 in an enabled condition only for alternate pulses from the generator 18. Thus, the read-out timing pulses TP3 are generated at a frequency *f*, which is the frequency of the output device 12 and is half the frequency 2*f* of the generator 18.

Each succeeding pair of read-out timing pulses TP3 and TP4 effects a read-out and shift operation in the memory registers 36, 38 in a manner similar to that described above. The characters that are read out are in the same serial order as the input characters due to the serial operation of the registers 36 and 38.

When the core 82 of the reversible register 78 is in 1-state, the next input character is directed into the memory cores 40, 140 by the pulse generated at the distributor output position 70. At this time, the 1-state of the core 82 is transferred via the core 88 to the core 80. The core 80 in the 1-state represents the situation of the memory being full. If another input character is received from the read-out operation, the resulting shift-left operation on the core 80 induces a pulse, which is applied to an alarm 190, and which is also applied by way of the connection 192 to the information source 10 to terminate further supply of input characters.

If a read-out operation is performed when the core 86 is in the 1-state, a pulse is induced at the connection 194, which pulse is applied to the R-input of the flip-flop 182 to reset that flip-flop and inhibit the generation of read-out timing pulses. This pulse at the connection 194 may also be applied to an alarm 196 to indicate that the memory 14 is empty.

The operation of the system of Figure 1 may be summarized as follows: Information is stored in a plurality of shift registers. The information is read-out of the last stage of each shift register by means of a shift operation to the right, which shift operation effects a transfer of each character to the next succeeding-order stage. The write-in of information starts with the last stage and proceeds successively for each information unit to the preceding stage in reverse order on the next-available-empty-stage basis. The write-in operations are controlled by a reversible distributor 16.

In one embodiment, the reversible distributor 16 is in the form of a reversible shift register in which there are a plurality of stages corresponding to the memory register stages. One of these reversible register stages is in the 1-state, and this 1-state stage marks the next available empty memory stages. With each write-in operation, the 1-state is shifted to the succeeding reversible register stage to the left; with each read-out operation the 1-state is shifted to the next stage on the right. Thereby the location of the 1-state in the reversible register always marks the location of the next-available-empty-state in the memory 14. The shift of the 1-state to the left with the write-in operation is used also to derive a pulse that controls the switching of the input character into the next-available-empty stages of the memory 14.

The size of the memory 14, that is, the number of information storage stages 40, 42, 44 in each register 36, 38, depends upon the difference between frequencies of the input source 10 and the output device 12 as well as the fluctuations that may occur in either frequency or both frequencies of the input and output devices. Another parameter that may affect the size of the memory 14 is the number of successive characters that are to be transmitted as a group from the source 10 to the output device 12. A group of successive characters is called a "message." These parameters also control the number of characters that should be initially written into the memory prior to the start of the first read-out operation, that is, prior to the read flip-flop 122 being set.

If the output-device frequency *f* is always to be less than the frequency of the source 10, the read-out operation may start immediately after the first character is written in the memory 14. However, if the read-out frequency may at any time be greater than the input frequency, some initial write-in is required prior to the start of the first read-out operation, and the capacity of the memory 14 is designed accordingly This initial write-in is equal to the product of two factors: One factor is made up of the extreme amount that the input frequency may fluctuate from the output frequency; these extreme fluctuations in input frequency may be due to the average input frequency being less than the constant frequency *f* of the output device 12, and also fluctuations that may take place in this input frequency from its average. The other of the two factors is equal to the overall time between the start of the first read-out operation and the time that the last read-out operation stops. The maximum value of this overall read-out time is equal to the maximum number of characters that a message may contain divided by the minimum output frequency.

The capacity of the memory 14 is greater than the amount of initial write-in if the input frequency may at any time be greater than the output frequency. This capacity of the memory 14 is equal to the amount of initial write-in plus a term that includes the product of the overall time for reading out and the extreme amount that the input frequency may exceed the output frequency. This last product term is the possible amount of excess of input characters over read-out charatcers during the overall read-out time.

The maximum amount of time for processing a message of a certain maximum length through the memory 14 is equal to the overall time for reading out a message of that length at the fixed frequency $f$ plus the maximum time that may be required to provide the initial write-in if, for example, the extreme variations in input frequency may be less than the output frequency $f$. A message generally should not be entered into the surge tank before the previous one has been suitably processed to avoid accumulation effects from message to message.

Appropriate forms of gate circuits that may be employed are described in the article "Diode Coincidence and Mixing Circuits" by Tung Chang Chien, in the Proceedings of the I.R.E., May 1950, page 511. The flip-flops and trigger circuit may each be a bistable multivibrator such as the Eccles-Jordan trigger circuit, examples of which are described in the book "High-Speed Computing Devices," McGraw-Hill 1950, chapter 3. The pulse former circuits may be one-shot multivibrators, and the delay circuits may be electrical delay lines. Other forms of memory shift registers that may be used are described in the U. S. Patent, No. 2,708,722. Another form of reversible shift register that may be used with the registers described in this last-mentioned patent is described in a doctoral thesis of M. K. Haynes, "Magnetic Cores as Elements of Digital Computing Systems," at the University of Illinois, the Graduate College, 1950, at pages 46–50. The reversible shift register shown in Figure 34, page 48 of this Haynes thesis, may be used in place of the reversible register 78 shown in Figure 1 with the following adaptation: The input terminal 76 of Figure 1 would be connected through an isolating circuit to the "up pulse" input of Figure 34, and also, by way of a phase inverter to the "up-L gate." The input 79 would be connected through an isolating circuit to the "up pulse" input and, by way of a phase inverter, to the "up-R gate." The inputs 94 and 96 of Figure 1 would be connected through isolating circuits to the "down pulse."

Other forms of magnetic core shift registers may also be used. For example, magnetic-core shift registers known as one-core-per-bit circuits may be used. An appropriate form of such circuits is described in the co-pending patent application, Serial No. 508,158, "Magnetic Systems," filed May 13, 1955. A suitable reversible register of the one-core-per-bit type is described in the patent application, Serial No. 508,103, "Reversible Counter," filed May 13, 1955. In these one-core-per-bit registers, only one write-in timing pulse, TP1, and only one read-out timing pulse, TP3, are required.

This invention is not limited to the type of reversible distributor that includes a reversible shift register. Other forms of reversible distributors may be used. For example, one form of pulse distributor used in the computer art is that which includes a binary counter whose binary outputs are connected to a decoding matrix. In the book "High-Speed Computing Systems," cited above, on page 52, a decoding matrix is shown for binary input signals. A reversible binary counter may be used to drive the input of this matrix. The pulse from such a counter is distributed at the outputs of the matrix in a reversible fashion, as the count of the counter changes. The reversible counter may be driven to count in opposite directions by the write-in and read-out timing pulses in a manner similar to that described.

In the embodiment of Figure 1, the read-out processing operation from the memory 14 takes place at the fixed address of the last stages of the registers 36 and 38. The write-in processing operation takes place on a shifting-address basis; and the write-in address starts from the last stage shifting towards the first stage successively to the next stage in order. Another embodiment of this invention, described immediately below with respect to Figure 3, is arranged to perform the processing operation of write-in of information into the memory shift registers on a fixed-address basis, and to perform the processing operation of read-out on a shifting-address basis. As in the embodiment of Figure 1, the embodiment of Figure 3 uses a reversible distributor 16 to follow the write-in and read-out operations performed in the memory 14, and directs the shifting-addressing processing operation in the proper address in that memory 14.

In the embodiment of Figure 3, parts similar to those described above in the embodiment of Figure 1 are referenced by the same numerals; some parts that are the same as those described above are omitted from Figure 3 to simplify the presentation. Only one shift register 236 is shown in the memory 14; other memory shift registers are omitted to simplify the presentation. The shift register 236 may be of the type having a plurality of triggerable flip-flop stages 203 to 207. The flip-flops 203 to 207, together with two preceding buffer stages 201, 202, are connected in cascade as a count-up binary counter with the trigger output $T_o$ of each stage being connected to the trigger input $T_i$ of the succeeding stage. Such counters are well known, and a suitable one is described in the above-cited book "High-Speed Computing Devices," chapter 3. The R-inputs of the odd-numbered stages 201, 203, 205, 207 receive TP1; the R-inputs of the even-numbered stages 202, 204, 206 receive TP2. The first stage 201 functions as a buffer storage, somewhat like the flip-flop 24 of Figure 1, and the input channel 22 is connected to its S-input. The even-numbered stages function as transfer stages as in the usual two-stage-per-bit shift register (one-stage-per-bit registers may also be used, if desired).

The 1-outputs of the stages 203, 205, 207 are respectively connected to 2-input "and" gates 209, 210, 211. The pulse amplifiers 71, 72, 73 of the distributor 16 are respectively connected to the other inputs of the gates 209, 210, 211. The outputs of the gates 209, 210, 211 are connected by way of an "or" gate 213 to the output device 12.

The read-out flip-flop 122 is set, by way of an amplifier, from the shift-right output of the distributor stage 88. A preset pulse is applied to the distributor stage 80. TP1 is used as a shift-pulse for the distributor stages 80, 82, 84, and 86; TP2 is used as a shift-right pulse for the intermediate transfer stages 88, 90, and 92. TP3 is used as a shift-left pulse for the stages 82, 84, 86; TP4 is used as a shift-left pulse for the intermediate transfer stages 88, 90, and 92.

The operation of the timing circuitry 100 for developing the timing pulses is generally the same as that shown in Figure 1. Likewise, the reversible distributor operation is similar to that shown in Figure 1 except for the differences noted above.

In operation, the shift register stages 201 to 207 are initially reset, as are the stages in the distributor 16, by appropriate means (not shown). The distributor stage 80 is then preset to the 1-state before operation of the information source 10.

The first character from the information source 10 is applied to the S-inputs of the buffer stages corresponding to the stage 201. The timing circuitry 100 develops from the input characters a pair of timing pulses TP1 and TP2 in a manner similar to that described above. TP1 is applied to the R-input of the stage 201 to reset that stage 201, which action results in the transfer of the information set into that stage 201 to the succeeding stage 202. The second timing pulse TP2 resets the stage 202 to actuate the transfer of the information in the stage 202 to the first memory stage 203; this timing pulse TP2 also resets the "write" flip-flop 106. This same pair of timing pulses TP1 and TP2 are successively applied to the stages 80 and 88 of the distributor register 78 to actuate transfer of the 1-state from the stage 80 to the stage 82, and to set the "read" flip-flop 122.

A second input character may be written in the buffer stage 201 in a similar manner and advanced to the first memory stage 203; the previous character being advanced to the stage 205 at the same time. The 1-outputs of the stages 203 and 205 correspond to the information stored in those stages, and these outputs, say in the form of voltage levels, are applied to the gates 209 and 210 to prime those gates. Thus, the gates 209, 210, 211 are always primed in accordance with the information stored in their associated stages. The advance of the first input character to the stage 205 as the second input character is written in the stage 203 is followed in the reversible distributor 16 by the advance of the 1-state from the stage 82 to the stage 84. The next processing operation in the memory 14 may be a read-out operation which is actuated by TP3 and TP4 in the timing circuitry 100 in a manner similar to that described above.

The timing pulse TP3 applied to the distributor stage 84 initiates the transfer of the 1-state in the stage 84 to the left to the next stage 90; this transfer operation results in a pulse being applied to the amplifier 72. The pulse 215 from the amplifier 72 is applied to the gate 210. The resulting output from the gate 210 is the 1-output of the memory stage 205. This output of the gate 210 is directed through the "or" gate 213 to the output device 12.

The timing pulse TP4 completes the transfer of the 1-state from the stage 90 to the stage 82. Thus, during the first read-out operation, the character first in order written in the memory is read out to the output device 12, and the 1-state in the distributor register 78 is shifted to the stage 82. The 1-state in the stage 82 marks the location or address of the stage 203 in the memory 14 where the character next in order is to be read out.

Successive write-in and read-out operations are performed in a similar manner; each input character is directed by way of the buffer stage 201 through the transfer stage 202 to the first storage stage 203. The address of the character next in order to be read out of the memory 14 shifts in opposite directions from stage to stage in the memory register 236, as the write-in and read-out operations are performed. The reversible distributor transfers the 1-state from stage to stage in opposite directions with each write-in and read-out operations, respectively; the location of the 1-state in the distributor register 78 marks the address of the character next in order to be read out. The transfer of the 1-state to the left in the reversible distributor 78 generates a pulse which is applied to the proper one of the gates 209, 210, 211 to read out the next character in order. Thus, the information characters read out to the output device 12 are in the same order as they are read into the memory 14.

The characters stored in the memory register 236 are shifted from stage to stage to the last stage 207. When that last stage 207 is reset, the information stored therein is destroyed. However, by the time this reset operation of the last stage 207 takes place (except for a faulty operation for which an alarm is provided) the information in that stage 207 has been read out to the output device 12 by way of one of the gates 209, 210, 211.

In accordance with this invention, a new and improved information storage system is provided. This system may be used to transfer information between information handling devices that operate at different rates. With this system, fluctuations in an operating rate may be provided for. The information transfer from one device to another is controlled so that the information is transferred in the proper sequence.

What is claimed is:

1. An information storage system comprising a shift register having a plurality of stages operatively arranged in serial order, said register including means for performing one of the write-in and read-out processing operations at a certain one of said stages on an ordered series of information units and separate means for performing the other of said processing operations at different ones of said stages, and means for selecting and controlling said separate means to perform said other operation at a corresponding one of said stages to maintain the order of said information, said controlling means including reversible distributor means responsive in one sense to the performing of said one processing operation and responsive in the reverse sense to the performing of the said other processing operation thereby following changes in location of information in said register with each of said processing operations.

2. An information storage system comprising a shift register having a plurality of stages operatively arranged in a serial order, said register including means for reading signals out of a certain stage last in order and separate means responsive to actuating signals for writing signals in said stages, and means for controlling the write-in operation means to write signals in said stages each in the first available empty stage in reverse order starting from the last stage, said controlling means including a reversible distributor means for supplying an actuating signal to said writing means of said first available empty stage, said distributor including means for following changes in location of said first available empty stage with each of said write-in and read-out operations.

3. An information storage system in which the order of output information is the same as that of input information, said system comprising a shift register having a plurality of information-storing stages operatively arranged in a serial order, said register including means for writing information in a certain stage first in order and separate means responsive to actuating signals for reading out information from said stages, and means for controlling the read-out means to read out information from said stages and each information unit from that stage having the information unit next in order, said controlling means including a reversible distributor means for supplying an actuating signal to said read-out means of said stage having the next-in-order unit, said distributor including means responsive in one sense to said write-in operation and in the reverse sense to said read-out operation.

4. An information storage system comprising a shift register having a plurality of signal-storing stages operatively arranged in a serial order, said register including means for performing a read-out operation by shifting signals from stage to stage in said order and reading signals out of a certain stage and means for performing a write-in operation including separate means responsive to actuating signals for writing signals in said stages, and means for controlling the write-in operation means to write signals in said stages and each in the first available empty stage in reverse order, starting from said certain stage, said controlling means including a reversible distributor means for supplying an actuating signal to said writing means of said first available empty stage, said distributor including means for following changes in location of said first available empty stage with each of said write-in and read-out operations.

5. An information storage system comprising a shift register having a plurality of signal-storing stages operatively arranged in a serial order, said register including means for performing one of the write-in and read-out processing operations, for shifting signals from stage to stage in said order, and for performing said one processing operation at a certain fixed stage and separate means for each of said stages and responsive to actuating signals for performing the other of said processing operations at different ones of said stages, and means for controlling said other operation performing means to perform said other operation at said stages and each in the next stage consistent with said order, said controlling means including a reversible distributor means for supplying an actuating signal to said other operation performing means of said next order stage, said distributor including means responsive in one sense to the performing of said one processing operation and responsive in the reverse sense to the performing of the said other processing operation.

6. An information storage system comprising a memory; means for applying information units to said memory in a certain order; said memory including means for performing one of the write-in and read-out processing operations at a fixed address in said memory, separate means for performing the other of said processing operations at different addresses in said memory, and means for transferring information in order between said fixed address and said different addresses; and means for controlling said other operation performing means to perform said other operation on each of said units at that one of said addresses consistent with both of said write-in and read-out operations being performed on said units in said order, said controlling means including reversible register means for following changes in location of said one address with each of said write-in and read-out operations and for actuating that one of said separate means associated with said one address when said other operation is to be performed, said reversible register being responsive in one sense to a said write-in operation and responsive in the reverse sense to a said read-out operation.

7. An information storage system as recited in claim 6, wherein said write-in processing operation is performed at a fixed address, and said read-out processing operation is performed at different addresses.

8. An information storage system comprising a memory; means for applying information units to said memory in a certain order; said memory including means for performing one of the write-in and read-out processing operations at a fixed address in said memory, separate means for performing the other of said processing operations at different addresses in said memory, and means for transferring information in order between said fixed address and said different addresses; and means for controlling said other operation performing means to perform said other operation on each of said units at that one of said addresses consistent with both of said write-in and read-out operations being performed on said units in said order, said controlling means including reversible register means for following changes in location of said one address with each of said write-in and read-out operations and for actuating that one of said separate means associated with said one address when said other operation is to be performed, said write-in processing operation being performed at a fixed initial address in said memory, and said read-out processing operation being performed at different addresses with each write-in and read-out operation thus causing said register and thereby said controlling means to follow said changes in address location respectively in said order and in the reverse of said order for controlling the succeeding read-out processing operation.

9. An information storage system comprising a memory; means for applying information units to said memory in a certain order; said memory including means for performing one of the write-in and read-out processing operations at a fixed address in said memory, separate means for performing the other of said processing operations at different addresses in said memory, and means for transferring information in order between said fixed address and said different addresses; and means for controlling said other operation performing means to perform said other operation on each of said units at that one of said addresses consistent with both of said write-in and read-out operations being performed on said units in said order, said controlling means including reversible register means for following changes in location of said one address with each of said write-in and read-out operations and for actuating that one of said separate means associated with said one address when said other operation is to be performed, said read-out processing operation being performed at a fixed address, and said write-in processing operation being performed at different addresses.

10. An information storage system comprising a memory; means for applying information units to said memory in a certain order; said memory including means for performing one of the write-in and read-out processing operations at a fixed address in said memory, separate means for performing the other of said processing operations at different addresses in said memory, and means for transferring information in order between said fixed address and said different addresses; and means for controlling said other operation performing means to perform said other operation on each of said units at that one of said addresses consistent with both of said write-in and read-out operations being performed on said units in said order, said controlling means including reversible register means for following changes in location of said one address with each of said write-in and read-out operations and for actuating that one of said separate means associated with said one address when said other operation is to be performed, said read-out processing operation being performed at a fixed address last in order, and said write-in processing operation being performed at different addresses each in the first available address in reverse order at which an information unit may be properly written.

11. An information storage system comprising a shift register having a plurality of signal-storing stages operatively arranged in a serial order; means for shifting signals from stage to stage in said order and for reading signals out of the stage last in order; and means for writing signals in said stages successively in reverse order and each in the first available empty stage, said signal writing means including input means for supplying input signals to be written in said stages, a reversible distributor means for producing switching signals at a plurality of positions, each of said positions corresponding to a different one of said register stages and operatively arranged in said serial order, and switching means responsive to said switching signals for applying said input signals to those of said register stages corresponding to the positions at which said switching signals are produced, said distributor means including means for changing in said reverse order the position at which a switching signal is produced incident to an input signal to be written in a stage and for changing in said serial order the position at which a switching signal is produced incident to the shifting signals from stage to stage and the reading of a signal out of the last stage.

12. A signal storage system comprising a shift register having a plurality of serially ordered stages and having an input terminal for receiving input signals to be written in said register and an output terminal for receiving output signals read out therefrom; separate means responsive to an actuating signal for coupling one of said terminals to each of said stages, the other of said terminals being connected only to a certain one of said stages; means for applying read out signals to said register to read signals therefrom; a bidirectional distributor having a plurality of actuating positions serially ordered in correspondence to said stages, said distributor being operable to place one of said positions in an active state to supply an actuating signal to said connection means, said distributor being responsive to one of said input and read-out signals for supplying an actuating signal to the one of said stage coupling means corresponding to the distributor position in an active state, said distributor including means responsive to said one and to the other of said input and read-out signals for respectively shifting the active state successively in opposite directions from position to position.

13. A signal storage system comprising a first and a second shift register, each including a plurality of signal-storing stages operatively arranged in a serial order, said first register including separate means for writing input signals in said stages in response to an actuating signal and means for shifting signals from stage to stage in said order and for reading signals out of said last stage, said second shift register being reversible and including means for shifting a signal from the stage to the succeeding stage in said order when a signal is read out of said last stage, said shifting means being further operative for shifting a signal from one stage to the succeeding stage in reverse order and for directing an actuating signal to an appropriate one of said writing means of said first register when an input signal is to be written in the associated stage of said first register.

14. An information storage system comprising a plurality of shift registers, each of said registers having a plurality of stages operatively arranged in the same serial order, each of said registers including means for performing one of the write-in and read-out processing operations at a certain one of said stages on an ordered series of information units and separate means for performing the other of said processing operations at different ones of said stages; and means for selecting and controlling said separate means to perform said other operation at an appropriate one of said stages of each of said registers to maintain said information in a certain order, said controlling means including reversible register means responsive in one sense to the performing of said one processing operation and responsive in the reverse sense to the performing of the said other processing operation thereby following changes in location of information in said shift registers with each of said processing operations.

15. A signal storage system comprising a plurality of shift registers each having a plurality of serially ordered stages; means for writing a group of input coded signals in certain ones of said stages of corresponding order; means for reading signals from said stages of the last order, said reading means including means for shifting signals from each stage to the stage of next succeeding order; a reversible distributor having a plurality of serially-ordered positions each corresponding to a different one of said stages, said distributor producing a control signal at one of said positions in response to a group of input coded signals and at said positions seriatim in one direction in response to successive input signal groups, said distributor being responsive to each read out of a signal group for changing by one position in the opposite direction the order of position at which said control signal is produced, said writing means including means responsive to said control signal at one of said positions for directing said signal to the ones of said stages corresponding to said one distributor position.

16. An information storage system comprising a memory; means for supplying groups of a certain number of information units to said memory in a certain group order, said memory having a plurality of similar parts, a different one of said parts being associated with each of said units in a group, each of said parts individually including means for performing one of the write-in and read-out processing operations at a fixed address in said memory part, separate means for performing the other of said processing operations at different addresses in said memory part, and means for transferring information between said fixed address and said different addresses; and means for controlling said other operation performing means to perform said other operation on the units of each of said information groups at one of said addresses consistent with both of said write-in and read-out operations being performed on said groups in said order, said controlling means including reversible means for following changes in location of said one consistent address with each of said write-in and read-out operations and for actuating the one of said separate means of each of said memory parts associated with said one consistent address.

References Cited in the file of this patent

UNITED STATES PATENTS

| | | |
|---|---|---|
| 2,719,961 | Karnaugh | Oct. 4, 1955 |
| 2,769,925 | Saunders | Nov. 6, 1956 |
| 2,770,797 | Hamilton et al. | Nov. 13, 1956 |
| 2,781,503 | Saunders | Feb. 12, 1957 |